United States Patent [19]
Izumisawa et al.

[11] Patent Number: 5,995,242
[45] Date of Patent: Nov. 30, 1999

[54] FACSIMILE TRANSMISSION METHOD USING NON-STANDARD TONES, AND FACSIMILE MACHINE EMPLOYING SAME

[75] Inventors: Hideo Izumisawa; Hiroshi Endo, both of Tokyo, Japan

[73] Assignee: Oki Data Corporation, Tokyo, Japan

[21] Appl. No.: 08/778,428

[22] Filed: Jan. 2, 1997

[30] Foreign Application Priority Data

Jan. 9, 1996 [JP] Japan .................................. 8-018419

[51] Int. Cl.$^6$ .................................................. H04N 1/00
[52] U.S. Cl. ........................ 358/434; 358/436; 358/440
[58] Field of Search .................................. 358/434, 406,
358/438, 468, 440, 435, 442, 400, 402,
404, 444; 379/100.01, 100.15, 93.32, 93.28,
93.26

[56] References Cited

U.S. PATENT DOCUMENTS

| | | | |
|---|---|---|---|
| 4,748,662 | 5/1988 | Hirata | 379/356 |
| 4,910,764 | 3/1990 | Bowen | 379/100 |
| 5,025,469 | 6/1991 | Bingham | 379/98 |
| 5,065,254 | 11/1991 | Hishida | 358/400 |
| 5,150,400 | 9/1992 | Ukegawa | 379/93 |
| 5,208,682 | 5/1993 | Ahmed | 358/434 |
| 5,303,066 | 4/1994 | Kawaguchi | 358/434 |
| 5,311,589 | 5/1994 | Bennett et al. | 379/386 |
| 5,877,870 | 3/1999 | Sakai | 358/438 |

FOREIGN PATENT DOCUMENTS

61-134175    6/1986    Japan .

*Primary Examiner*—Madeleine Nguyen
*Attorney, Agent, or Firm*—Akin, Gump, Strauss, Hauer & Feld, L.L.P.

[57] ABSTRACT

A group-three facsimile machine answers a call by transmitting at least one non-standard tone, before transmitting the standard called terminal identification tone or modulated answer tone. The non-standard tone invites the calling facsimile machine to modify the usual group-three handshaking procedure in such a way that under certain conditions, the procedure can be shortened. Among the many possible modifications are immediate transmission of a password, immediate transmission of training signals if the calling facsimile machine already knows the capabilities of the called facsimile machine, and immediate disconnection if the non-standard tone indicates that the called facsimile machine lacks a necessary capability.

20 Claims, 16 Drawing Sheets

3RD TABLE

600 Hz (MT0)   4800 bps
800 Hz (MT1)   9600 bps
1000 Hz (MT2)  14400 bps
...            ...
2600 Hz (MT10) SHORT PROCEDURE
2800 Hz (MT11) ECM

FACSIMILE TRANSMISSION METHOD USING NON-STANDARD TONES, AND FACSIMILE MACHINE EMPLOYING SAME

BACKGROUND OF THE INVENTION

The present invention relates to a method of performing facsimile transmissions, involving the sending of one or more non-standard tones from the called facsimile machine to the calling facsimile machine at the beginning of the call, and to facsimile machines implementing this method.

Facsimile transmission methods have been standardized by the Telecommunication Standardization Sector of the International Telecommunication Union (ITU-T) in Recommendation T.30, entitled Procedures for Document Facsimile Transmission in the General Switched Telephone Network. In these methods, the transmission of facsimile image data is preceded by a handshaking sequence in which the called facsimile machine informs the calling facsimile machine of the capabilities supported by the called facsimile machine, and the calling facsimile machine selects the capabilities to be used during the transmission. These capabilities may include both standard capabilities described in Recommendation T.30, and non-standard capabilities provided by various manufacturers. The handshaking sequence may also include such features as a password check.

Because of the many non-standard capabilities provided by recent facsimile machines, the handshaking procedure can take considerable time. The handshaking time may exceed the facsimile-page transmission time, for example. In this case every facsimile transmission begins with a noticeable delay that the user would prefer to avoid. Some recent facsimile machines, which incorporate modulator-demodulator facilities complying with ITU-T Recommendation V.34, shorten the handshaking time by transmitting the information about machine capabilities at a high-speed data rate, but these V.34-capable facsimile machines require additional handshaking to establish V.34 communication parameters, so there is still a significant delay at the beginning of every facsimile transmission.

A known method of avoiding such delays equips a facsimile machine with a memory for storing information about the capabilities of distant facsimile machines to which speed dialing numbers are assigned. The user enters this information when assigning the speed dialing numbers. When calling a distant facsimile machine known to have certain capabilities, the user's facsimile machine sends a tone informing the distant facsimile machine that its capabilities are known and information about them does not have to be sent.

A disadvantage of this method is that it is inconvenient for the user to have to enter extra information when assigning speed dialing numbers. In many cases the necessary information will not even be available to the user. A further disadvantage that the user may enter the information incorrectly, creating communication problems later.

Another type of delay that the user would like to avoid occurs when the facsimile transmission cannot be completed for some reason, such as an invalid password, but this does not become known until midway through the handshaking sequence.

SUMMARY OF THE INVENTION

A general object of the present invention is therefore to avoid unnecessary delays at the beginning of facsimile transmissions.

A more specific object is to avoid the unnecessary exchange of known handshaking information.

Another more specific object is to avoid the unnecessary exchange of information before a password check.

A further object is to spare facsimile users the trouble of having to enter information about the capabilities of distant facsimile machines.

According to the invented method, a group-three facsimile machine answers a call by transmitting at least one non-standard tone, indicating a readiness to modify the group-three handshaking procedure by omitting part of the procedure if a certain condition is satisfied. Unnecessary delays are thereby avoided when the calling facsimile machine recognizes the tone and the condition is satisfied.

According to a first aspect of the invention, the condition is that the calling facsimile machine already knows the capabilities of the called facsimile machine. In this case the procedure is modified by having the calling facsimile machine send immediate handshaking signals to the called facsimile machine, without having the called facsimile machine transmit information about its capabilities. The calling facsimile machine acquires this information the first time it calls the called facsimile machine, and retains the information in a memory unit for use in later calls to the same facsimile machine.

According to a second aspect of the invention, the non-standard tone has a selectable frequency and provides information about at least one capability of the called facsimile machine. If the non-standard tone indicates that the called facsimile machine lacks a capability necessary for the facsimile transmission, the calling facsimile machine can terminate the call immediately.

According to a third aspect of the invention, the non-standard tone requests a password. If the calling facsimile machine replies with an invalid password, the called facsimile machine can terminate the call immediately.

BRIEF DESCRIPTION OF THE DRAWINGS

The invention will be described with reference to the attached drawings, in which.

DETAILED DESCRIPTION OF THE INVENTION

The embodiments described below show examples of ways in which the present invention can be practiced.

First Embodiment

Figure 1:
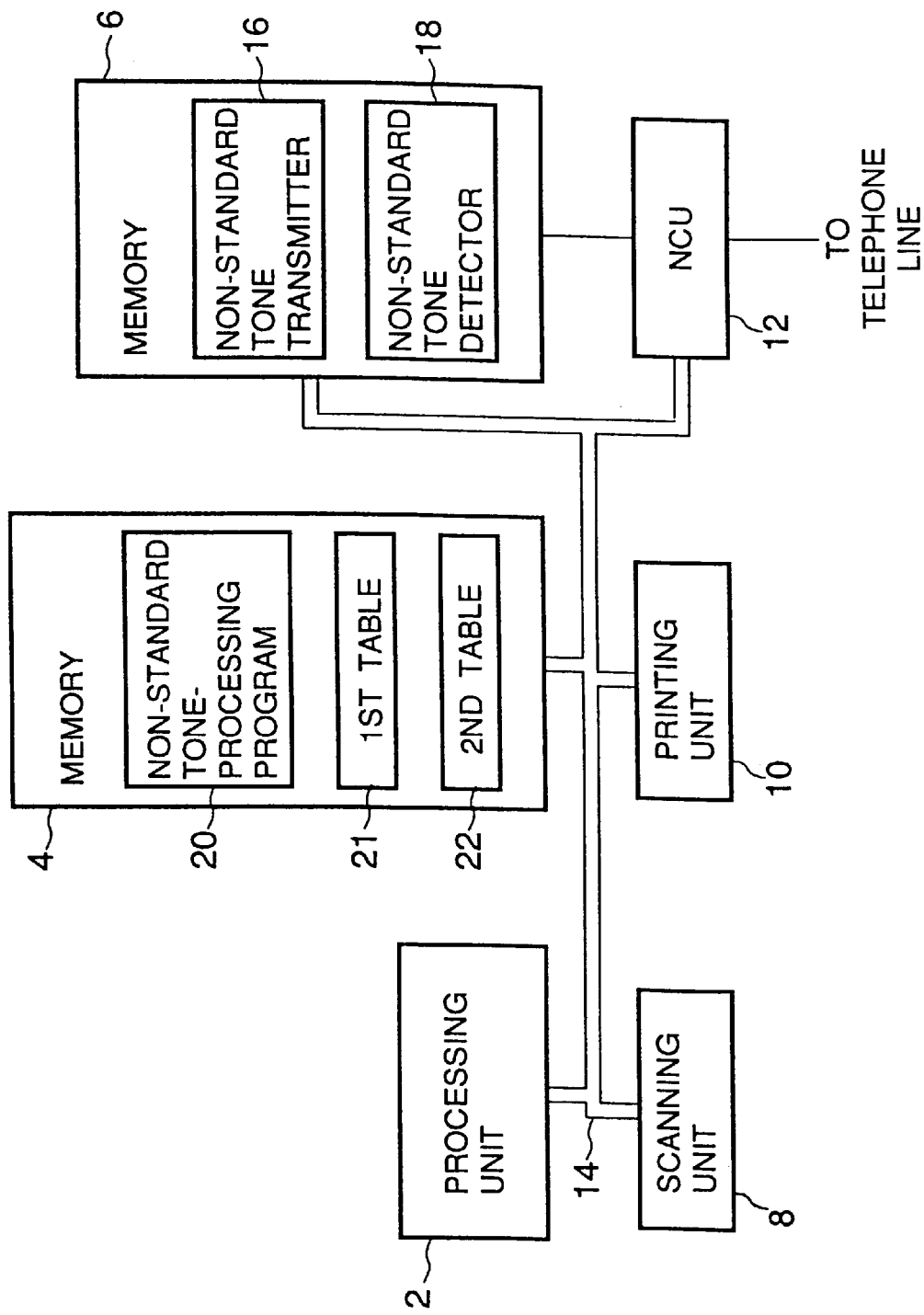
FIG. 1 is a block diagram of a first embodiment of the invented facsimile machine.

Referring to FIG. 1, the invented facsimile machine, like facsimile machines in general, comprises a processing unit 2, a memory unit 4, a modulating and demodulating unit (modem) 6, a scanning unit 8, a printing unit 10, and a network control unit (NCU) 12, which are interconnected by a bus 14. The scanning unit 8 scans documents for transmission to a distant facsimile machine. The printing unit 10 prints documents received from a distant facsimile machine. Using information stored in the memory unit 4, the processing unit 2 performs such tasks as image processing, data compression, and data decompression, as well as overall control of the facsimile machine. The memory unit 4 comprises both read-only memory (ROM) and random-access read-write memory (RAM). The modem 6 transmits and receives data by a frequency-shift keying (FSK) scheme, over a telephone line to which the modem 6 is connected through the NCU 12. The modem 6 also transmits and receives various tone signals.

The novel elements in the first embodiment are a non-standard tone transmitter 16 and non-standard tone detector 18 disposed in the modem 6, and a non-standard tone-processing program 20, first table 21, and second table 22 disposed in the memory unit 4. The non-standard tone transmitter 16 comprises, for example, tone generators for generating tones of various frequencies, and an analog switch, controlled by the processing unit 2, for selecting one of the generated tones. The non-standard tone detector 18 comprises, for example, a filter bank with filters tuned to the frequencies to be detected, which are the same frequencies as generated by the non-standard tone transmitter 16. Descriptions of the non-standard tone-processing program 20 and first and second tables 21 and 22 will be given later.

Figure 2:
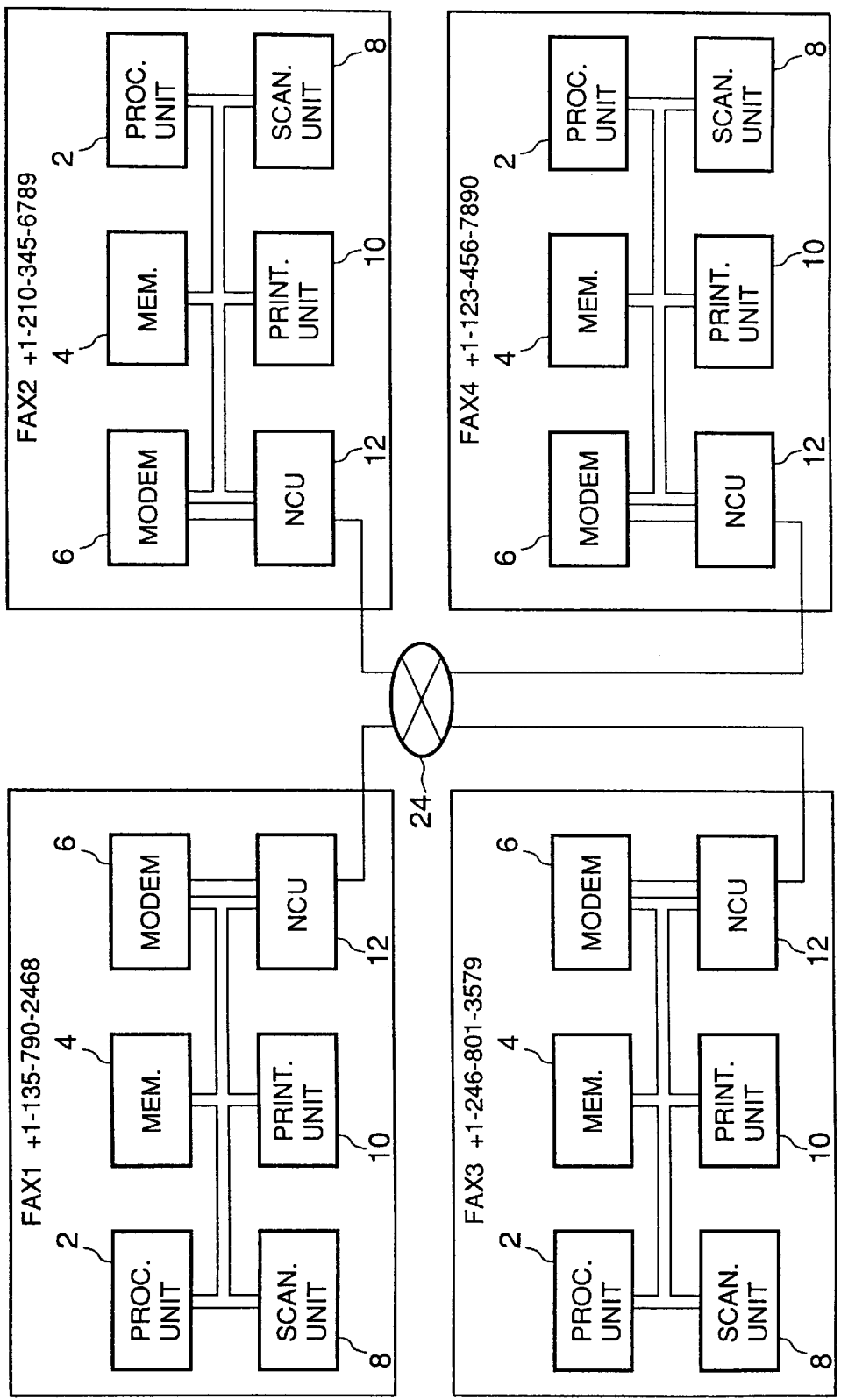
FIG. 2 illustrates interconnections among facsimile machines via the general switched telephone network.

Facsimile machines of the invented type (and other types) communicate via telephone lines as shown in FIG. 2. FAX1, FAX2, FAX3, and FAX4 designate four facsimile machines that are interconnected through a switched telephone network 24. Each facsimile machine has an international telephone number, e.g. +1-135-790-2468 for FAX1.

The invented facsimile machine is a so-called group-three facsimile machine, meaning that it follows the procedures described in ITU-T Recommendation T.30. This Recommendation divides a facsimile transmission into five phases, beginning with a call establishment phase (Phase A) and a pre-message phase (Phase B). Phase A comprises the usual procedures for establishing a telephone connection between the calling and called facsimile machines, the transmission of a calling tone (CNG) from the calling facsimile machine, and the transmission of a called terminal identification tone (CED) from the called facsimile machine. Phase B comprises the transmission of data according to a high-level data link control (HDLC) protocol, for identifying and selecting the capabilities of the called facsimile machine.

CNG is a 1100-Hz tone with a duration of half a second (0.5 s), which may be repeated after an interval of three seconds (3 s). CED is a 2100-Hz tone with a duration of about three seconds (2.6 s to 4 s). These tones identify the terminals as group-three facsimile machines, partly for the benefit of a human being who may have mistakenly called or been called by the facsimile machine.

In the description of the present invention, the entire procedure from the transmission of the CNG and CED tones to the end of phase B will be referred to as the T.30 handshaking procedure. Various T.30 handshaking procedures are possible, two of which will be described next.

Figure 3:
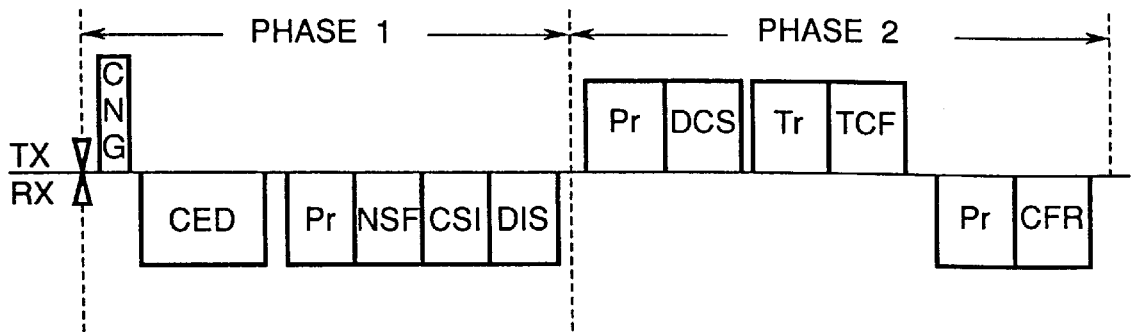
FIG. 3 illustrates a standard T.30 handshaking procedure.

FIG. 3 illustrates a standard T.30 handshaking procedure, using the symbol TX to indicate the calling facsimile machine and RX to indicate the called facsimile machine. The procedure can be divided into phases one and two. These phases are not the same as the T.30 phases A and B: phase one consists of part of phase A and part of phase B; phase two consists of the rest of phase B.

In phase one, following reception of the CNG tone and transmission of the CED tone, the called facsimile machine transmits a preamble (Pr) and one or more HDLC frames: a non-standard facilities frame (NSF), a called subscriber identification frame (CSI), and a digital identification signal (DIS). NSF is an optional frame describing various capabilities, not specified in the T.30 Recommendation, which the manufacturer may provide in the called facsimile machine. CSI is an optional frame giving the international telephone number of the called facsimile machine. DIS is a mandatory frame describing standard group-three capabilities of the called facsimile machine, such as data transmission rates, an error-correction mode, dot resolution, scan-line length, and maximum page length. To ensure reception, the preamble, NSF, CSI, and DIS are transmitted at a fixed rate of three hundred bits per second (300 bps).

In phase two, also transmitting at three hundred bits per second, the calling facsimile machine sends a HDLC preamble (Pr) followed by a digital command signal (DCS), which specifies the data transmission rate and other standard T.30 capabilities to be used in the facsimile image transmission. DCS is followed by modem training signals (Tr) and an all-zero training check (TCF), transmitted at the selected data transmission rate (e.g. 4800 bps or 9600 bps). If the called facsimile machine is able to train its modem correctly, it replies with another preamble (Pr), then a confirmation-to-receive (CFR) frame. If training is unsuccessful, phase two is repeated, with a slower data transmission rate selected, for example.

Figure 4:
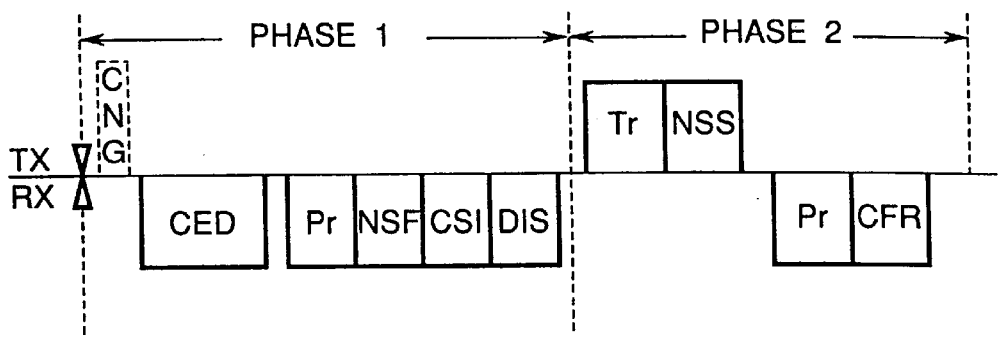
FIG. 4 illustrates a conventional short version of the T.30 handshaking procedure.

FIG. 4 shows a short version of the T.30 handshaking procedure which is often employed. Phase one is the same as before, except that the calling tone (CNG) may be omitted, as indicated by the dotted line. In phase two, the calling facsimile machine immediately sends training signals (Tr), followed by a non-standard set-up (NSS) frame. This NSS frame selects capabilities that were described in the NSF frame. If training and set-up are successful, the called facsimile machine responds with a preamble and CFR. If training or set-up is unsuccessful, phase two is repeated.

Figure 5:
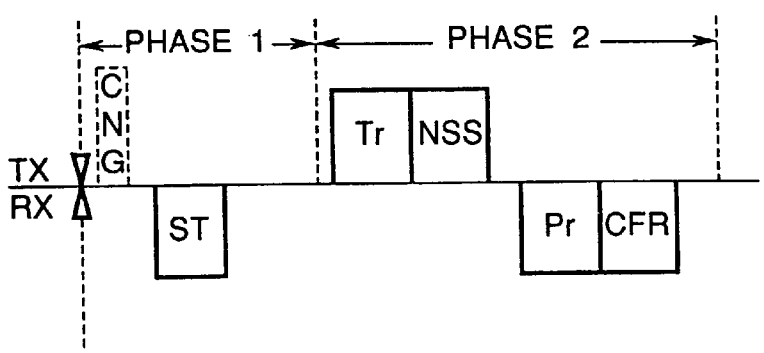
FIG. 5 illustrates a handshaking procedure according to the first embodiment.

When the called facsimile machine supports a large number of non-standard capabilities, it may be necessary to transmit several NSF frames, and the total length of phase one may exceed fifteen seconds. The first embodiment of the present invention seeks to shorten phase one as illustrated in FIG. 5, by having the called facsimile machine transmit a non-standard single-frequency tone (ST) with a frequency differing from the CED frequency of 2100 Hz. This tone ST indicates a readiness on the part of the called facsimile machine to omit the T.30 handshaking signals from CED to DIS (inclusive). If the calling facsimile machine is also willing to forgo these signals, the calling facsimile machine starts sending phase-two signals at once.

Omission of the part of the T.30 handshaking procedure from CED to DIS is conditional on the calling facsimile machine having the necessary information about the capabilities of the called facsimile machine already stored in the first table 21 in its memory unit 4. This information is acquired the first time the calling facsimile machine calls the called facsimile machine, at which time the T.30 handshaking procedure shown in FIG. 3 or 4 is followed.

Figure 6:
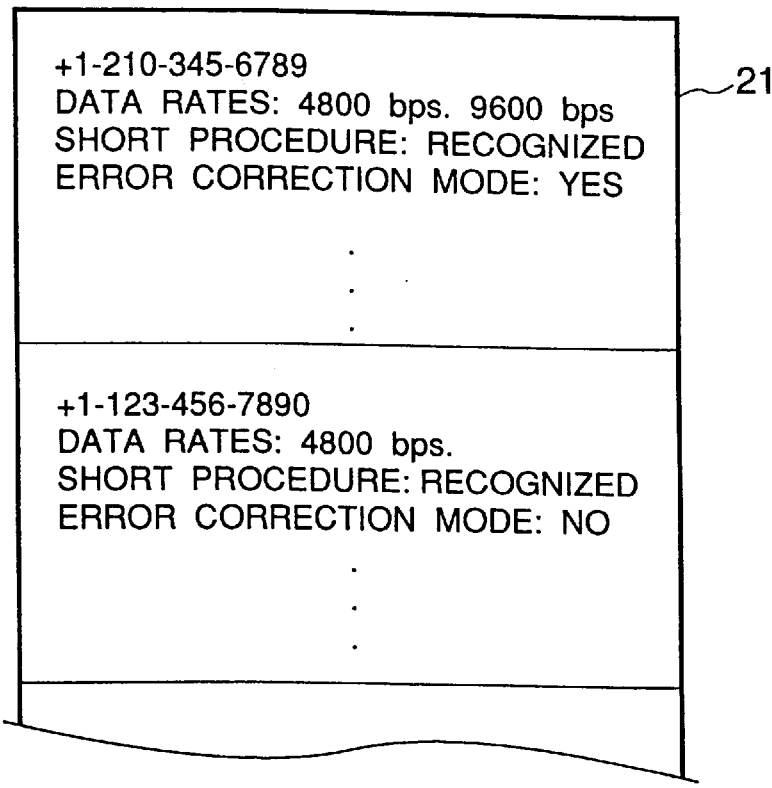
FIG. 6 illustrates the contents of the first table in FIG. 1.

FIG. 6 shows the type of information stored in the first table 21. This table comprises a plurality of areas, each containing the telephone number of a previously-called facsimile machine and information describing the capabilities of that facsimile machine. The first area, for example, describes a facsimile machine with telephone number +1-210-345-6789 that can communicate at data rates of 4800 and 9600 bps, can recognize the short version of the phase-two handshaking procedure shown in FIG. 4, supports the error correction mode, and has or fails to have various other capabilities (not shown). The second area describes a facsimile machine with telephone number +1-123-456-7890 that communicates only at 4800 bps, recognizes the short phase-two handshaking procedure, but does not support the error correction mode.

It is not necessary for the first table 21 to store full information about the capabilities of every called facsimile machine. There is no point in storing information about capabilities not supported by the calling facsimile machine, for example. In addition, information about some of the capabilities of the called facsimile machine may be encoded in the non-standard tone ST itself. It is particularly desirable that information about capabilities that are not permanently set, and thus may change from one call to another, be encoded in this way. A facsimile machine equipped with hoppers for both letter-size and legal-size paper, for example, can advantageously use the non-standard tone to indicate the present availability of these sizes of paper.

Figure 7:
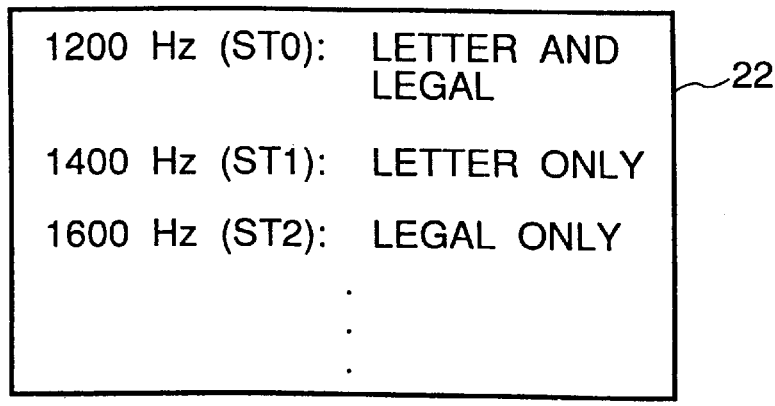
FIG. 7 illustrates the contents of the second table in FIG. 1.

In the first embodiment, the non-standard tone ST therefore has a selectable frequency. The second table 22 contains information indicating the meanings of the different frequencies that may be selected. FIG. 7 shows an example in which a frequency of 1200 Hz (ST0) indicates that the facsimile machine is currently loaded with both letter-size and legal-size paper, 1400 Hz (ST1) indicates that only letter-size paper is available, and 1600 Hz (ST2) indicates that only legal-size paper is available.

The operation of the first embodiment will next be described with reference to the flowcharts in FIGS. 8 and 9. These flowcharts illustrate different parts of the operation of the non-standard tone-processing program 20 in the memory unit 4, which is executed by the processing unit 2.

Figure 8:
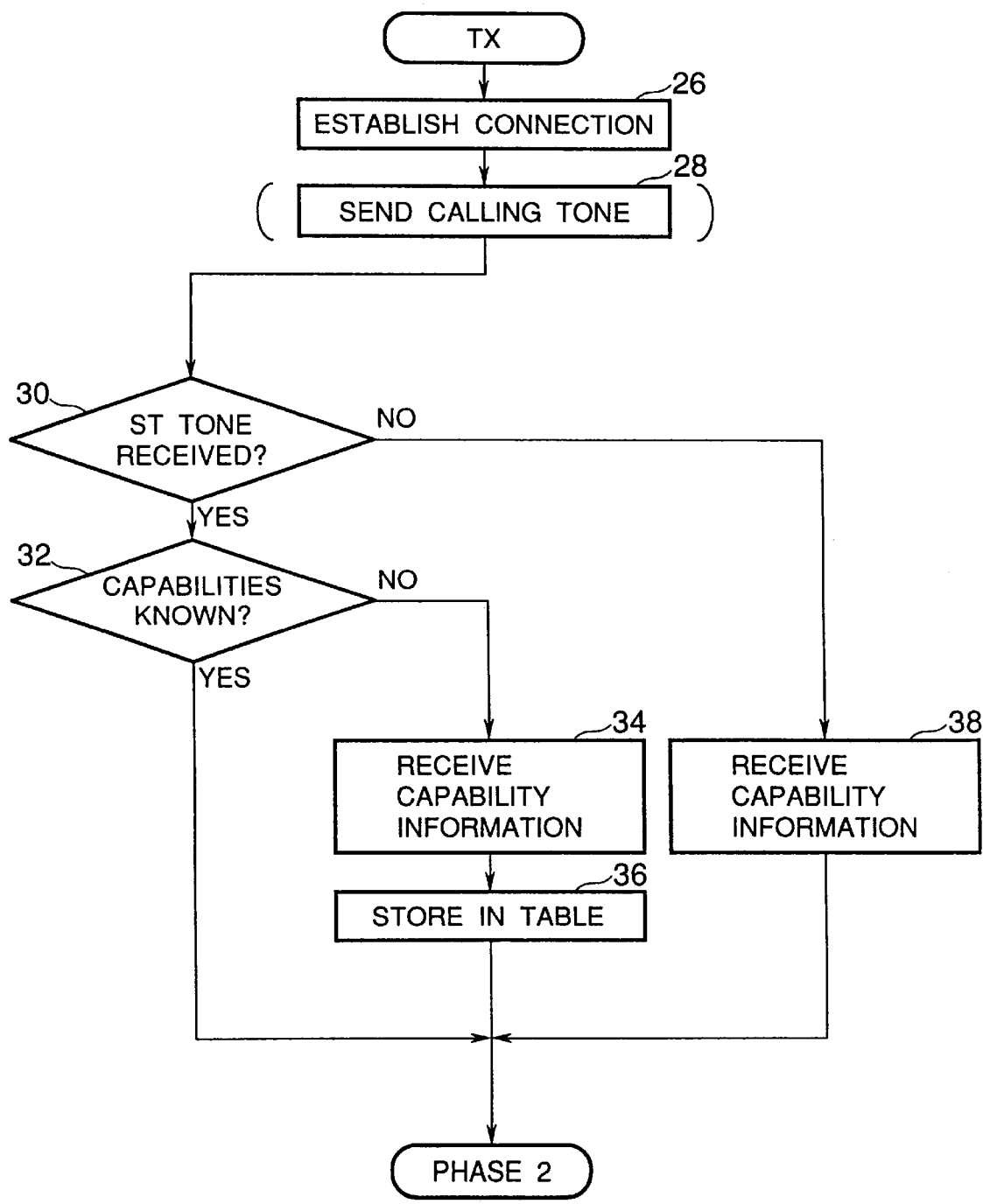
FIG. 8 illustrates a procedure followed by a calling facsimile machine according to the first embodiment.

FIG. 8 illustrates the operation of the calling facsimile machine (TX). The first step 26 is to originate the call and establish a connection with the called facsimile machine, by dialing a telephone number and waiting for the called facsimile machine to answer. The next step 28 is to send the T.30 calling tone (CNG). This step 28 is optional and may be omitted, e.g. when manual dialing is employed.

In the next two steps 30 and 32, the processing unit 2 in the calling facsimile machine monitors the output of the non-standard tone detector 18 to determine if a non-standard tone with one of the frequencies specified in the second table 22 (ST0, ST1, or ST2) is received from the called facsimile machine. If such a tone is received, in the next step 32 the processing unit 2 decides whether information about the capabilities of the called facsimile machine is stored in the first table 21. If the first table 21 contains this information, then as the capabilities of the called facsimile machine are already known, the processing unit 2 proceeds directly to phase two.

If the stored information indicates that the called facsimile machine recognizes the short version of phase two, the processing unit 2 sends training signals (Tr) and non-standard set-up command (NSS), as shown in FIG. 5. If the called facsimile machine does not recognize the short form of phase two, the processing unit 2 sends a preamble (Pr), digital command signal (DCS), training signals (Tr), and training check (TCF), as shown in FIG. 3. In either case, the selection of capabilities made in the NSS or DCS frame is based on the information read from the first table 21, and the further information provided by the non-standard ST tone itself, which the processing unit 2 interprets by means of the second table 22.

If the first table 21 does not contain information about the called facsimile machine, the processing unit 2 proceeds in step 34 to receive the information from the called facsimile machine by the standard phase-one procedure shown in FIGS. 3 and 4. The received information is stored in the first table 21 (step 36) and retained for use the next time the same facsimile machine is called. Then the processing unit 2 proceeds to phase two.

It is of course possible that the called facsimile machine does not implement the present invention and does not send a non-standard tone at the beginning of the call. The called facsimile machine may send the standard CED tone, for example, followed by the standard phase-one sequence of HDLC frames (preamble, NSF, CSI, DIS). The called facsimile machine may also begin sending HDLC frames immediately, without any preceding tone. In these cases, the processing unit 2 receives the capability information contained in the NSF and DIS frames (step 38), but does not store the received information in the first table 21. After phase one, the processing unit 2 proceeds into phase two as shown in FIGS. 3 or 4.

Figure 9:
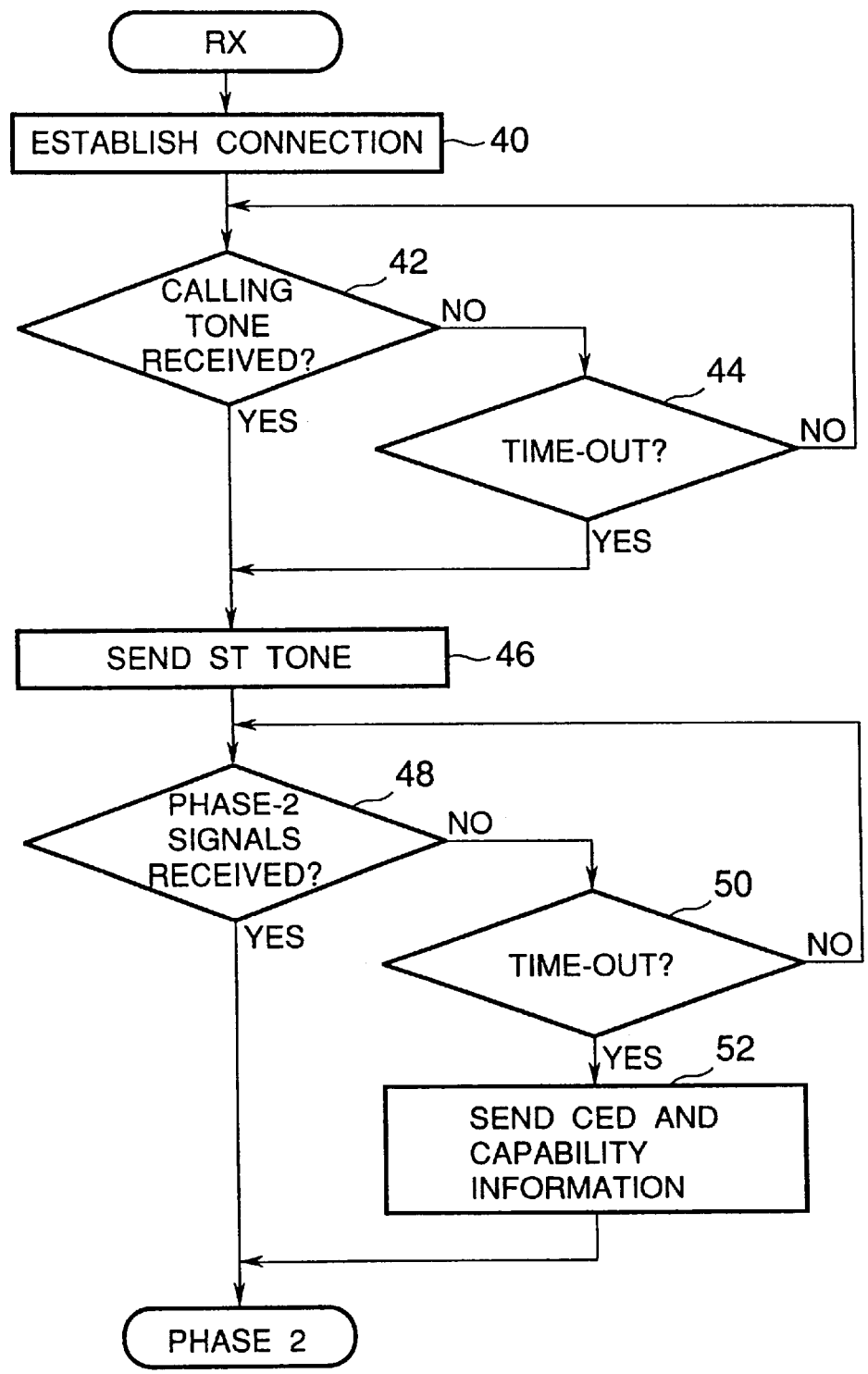
FIG. 9 illustrates a procedure followed by a called facsimile machine according to the first embodiment.

FIG. 9 shows the procedure followed by the called facsimile machine (RX) according to the first embodiment. After the telephone connection is established (step 40), the processing unit 2 in the called facsimile machine waits to receive a calling tone (CNG) in steps 42 and 44. As soon as a calling tone is received, the processing unit 2 proceeds to step 46. If no calling tone is received within a certain time, causing a time-out in step 44, the processing unit 2 stops waiting and proceeds to step 46 anyway. In step 46, the processing unit 2 commands the non-standard tone transmitter 16 to transmit a tone with one of the frequencies given in the second table 22, the frequency being selected according to the present status (e.g. paper availability) of the called facsimile machine.

After sending the non-standard tone, in steps 48 and 50 the processing unit 2 waits to receive phase-two signals from the calling facsimile machine: either the standard phase-two signals shown in FIG. 3, or the shorter version shown in FIGS. 4 and 5. Phase-two signals will be received only if the calling facsimile machine implements the present invention and has called the called facsimile machine before, so that information about the capabilities of the called facsimile machine is already stored in the first table 21 in the memory unit 4 of the calling facsimile machine. If this condition is satisfied, the calling facsimile machine proceeds directly from step 32 in FIG. 8 to phase two, and the called facsimile machine proceeds directly from step 48 in FIG. 9 to phase two, omitting the sending of HDLC frames (preamble, NSF, CSI, DIS) in phase one.

If the above condition is not satisfied, either because the calling facsimile machine does not implement the first embodiment, or because this is the first call from the calling facsimile machine to the called facsimile machine, a timeout will occur in step 50, and the processing unit 2 in the called facsimile machine will proceed with the standard phase-one procedure, sending the CED signal and the above-mentioned HDLC frames (step 52), followed by phase two as shown in FIG. 3 or FIG. 4.

As these flowcharts indicate, when both the calling and called facsimile machines implement the first embodiment, the called facsimile machine has to send the CED tone signal and phase-one HDLC frames only once: the first time the called facsimile machine is called by the calling facsimile machine. On subsequent calls the calling facsimile machine remembers the capabilities of the called facsimile machine, and repeated transfer of the same information at the slow 300-bps rate is avoided.

In these subsequent calls, the ST tone replaces both the sending of HDLC frames and the sending of the CED tone. Since the ST tone is intended for interpretation by a machine, it can be shorter than the CED tone. The first embodiment thus enables the entire phase-one handshaking procedure to be replaced by the exchange of two short tones (CNG and ST), or by the transmission of only a single short tone (ST).

Owing to use of the ST tone to convey information about capabilities, such as paper size, that may change from time to time, the calling facsimile machine does not have to remember information that may be invalid at the next call. This feature of the ST tone also increases the probability that the settings in phase two of the handshaking procedure can be completed successfully without having to be repeated.

A further advantage is that if the ST tone indicates that the called facsimile machine lacks a capability, such as a particular size of paper, that is needed for the current facsimile transmission, the calling facsimile machine can terminate the call by disconnecting immediately, without wasting time in further handshaking.

A still further advantage is that the calling facsimile machine acquires information about the capabilities of the called facsimile machine automatically, without troubling the user for entry of this information.

Second Embodiment

Next a second embodiment will be described.

Figures 10, 11:
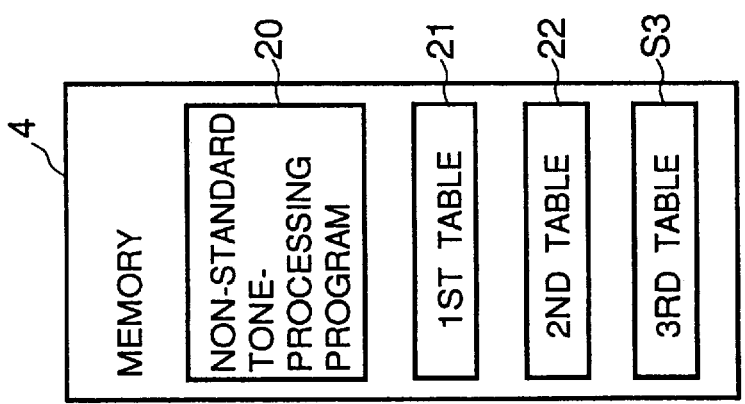
FIG. 10 illustrates the memory unit of a facsimile machine according to a second embodiment of the invention.
FIG. 11 illustrates the contents of the third table in FIG. 10.

A facsimile machine implementing the second embodiment has the general configuration shown in FIG. 1, except that the memory unit 4 also stores a third table 53 as shown in FIG. 10. This third table 53 specifies capabilities about which the ST tone does not provide information, such as supported data transmission speeds, support for the short version of phase two, and support for the error correction mode (ECM). As illustrated in FIG. 11, a separate frequency is assigned to each of these capabilities, the assigned frequencies differing from the frequencies assigned to the ST tone.

Figure 12:
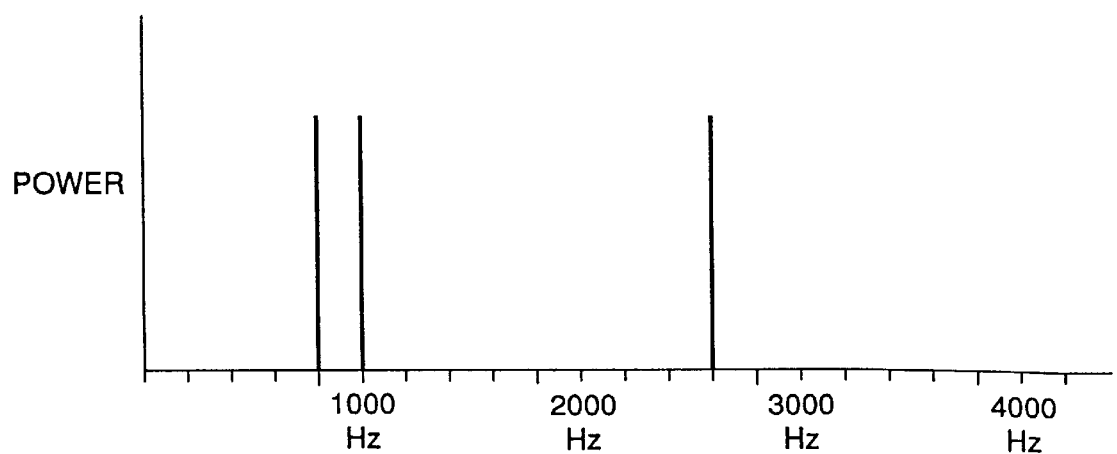
FIG. 12 illustrates the power spectrum of a multi-frequency tone.

The frequencies listed in the third table 53, identified in FIG. 11 as MT0, MT1, . . . , can be combined to form a multi-frequency tone conveying part or all of the information that would otherwise be given by the NSF and DIS frames. To indicate that the called facsimile machine has capabilities for data transmission at rates of 9600 bps and 14,400 bps and recognizes the short version of phase two, but does not support the error correction mode, for example, tones MT1, MT2, and MT10 are transmitted simultaneously to form a multi-frequency tone with frequency components of 800 Hz, 1000 Hz, and 2600 Hz. FIG. 12 illustrates the power spectrum of this multi-frequency tone, with power on the vertical axis and frequency on the horizontal axis. The non-standard tone transmitter 16 in the second embodiment is adapted to transmit such multi-frequency tones, as well as the non-standard single-frequency tone (ST), and the non-standard tone detector 18 is adapted to detect tones with all of the frequencies listed in the third table 53, as well as the frequencies listed in the second table 22.

Figure 13:
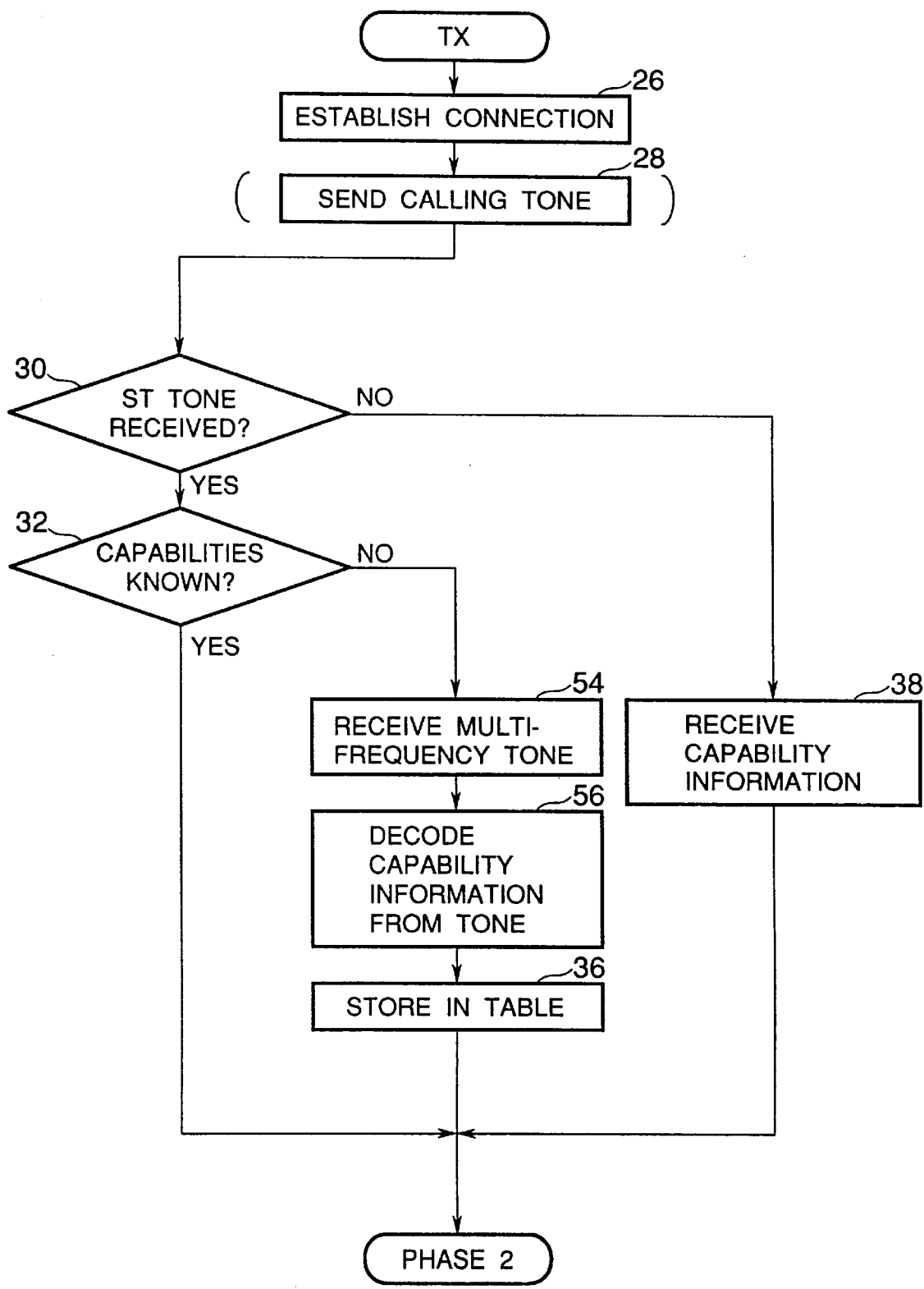
FIG. 13 illustrates a procedure followed by a calling facsimile machine according to the second embodiment.

FIG. 13 illustrates the handshaking procedure followed by the calling facsimile machine according to the second embodiment, using the same reference numerals as in FIG. 8 for identical steps. The difference between FIGS. 8 and 13 is that step 34 in FIG. 8 is replaced by steps 54 and 56 in FIG. 13. The following description will be confined to these new steps 54 and 56.

In step 54, when the calling facsimile machine has received the ST tone but does not already have information about the called facsimile machine stored in the first table 21, the calling facsimile machine receives a multi-frequency tone from the called facsimile machine. By monitoring the output of the non-standard tone detector 18, the processing unit 2 learns the frequencies present in the multi-frequency tone. In step 56, by referring to the third table 53, the processing unit 2 decodes the meaning of these frequencies and thus obtains information about the capabilities of the called facsimile machine. This information is stored in the first table 21 in the next step 36.

Figure 14:
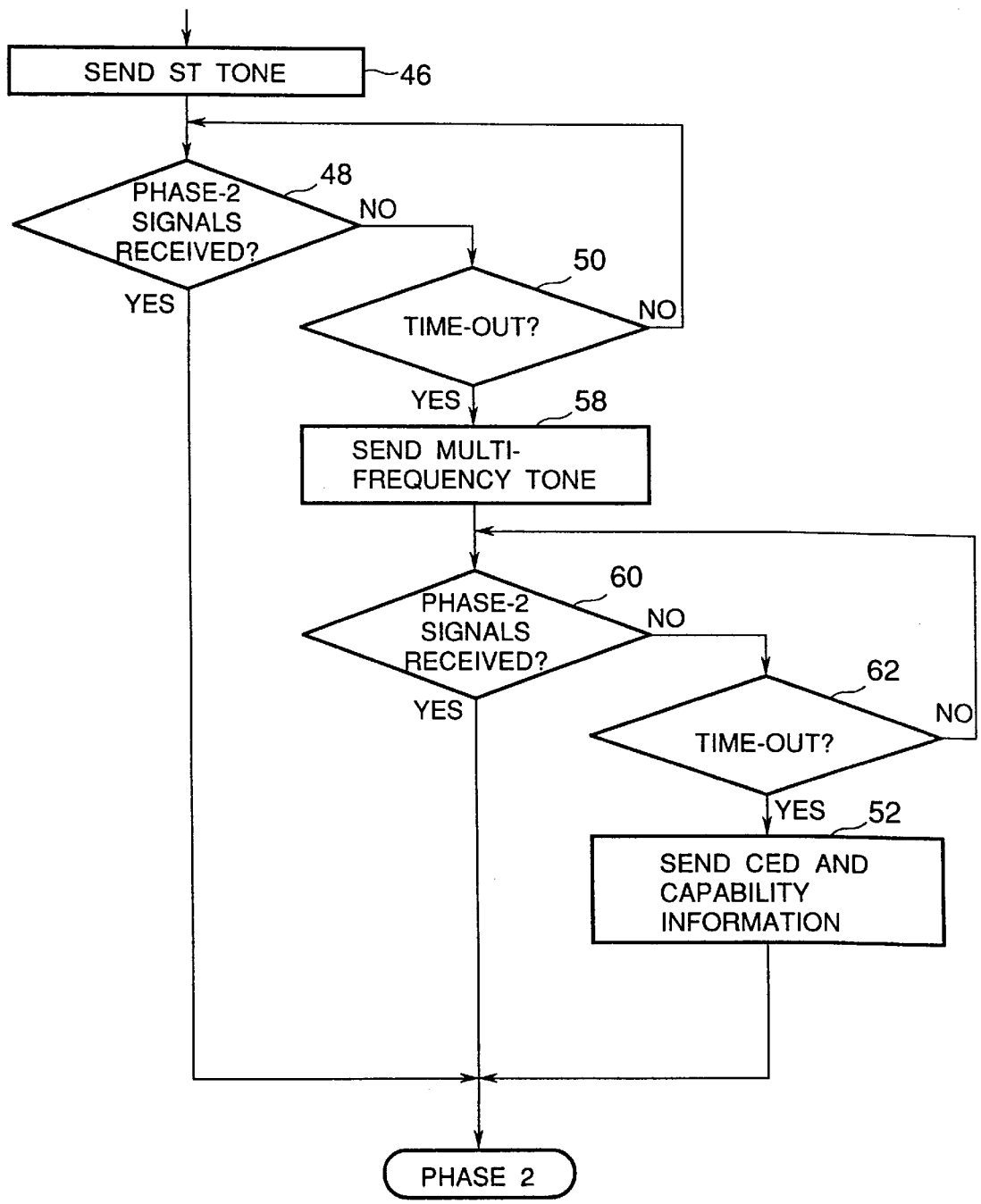
FIG. 14 illustrates part of a procedure followed by a called facsimile machine according to the second embodiment.

FIG. 14 illustrates the handshaking procedure followed by the called facsimile machine according to the second embodiment, using the same reference numerals as in FIG. 9 for identical steps, and starting from the sending of the non-standard ST tone in step 46. (This step 46 is preceded by steps 40, 42, and 44 in FIG. 9).

If a time-out occurs in step 50, the processing unit 2 accesses the third table 53 and commands the non-standard tone transmitter 16 to transmit a multi-frequency tone indicating the capabilities of the called facsimile machine (step 58), then waits to receive phase-two signals (steps 60 and 62). If the calling facsimile machine implements the second embodiment, as shown in FIG. 13, it will start sending such signals shortly after receiving the multi-frequency tone, enabling the called facsimile machine to proceed directly from step 60 to phase two. If phase-two signals do not arrive within a certain time, a time-out occurs in step 62; then the called facsimile machine transmits the CED tone and the HDLC frames (preamble, NSF, CSI, DIS) constituting the standard phase-one procedure.

The second embodiment thus operates like the first embodiment except during the first call from the calling facsimile machine to the called facsimile machine. On this first call, if both facsimile machines implement the second embodiment, the called facsimile will reports its capabilities by means of the multi-frequency tone, instead of by the standard phase-one procedure. Phase one then consists of the transmission of two non-standard tones from the called facsimile machine to the calling facsimile machine: first the single-frequency tone ST, then the multi-frequency tone. No CED tone signal or HDLC frames need be transmitted.

The second embodiment provides the same advantages as the first embodiment, with the additional advantage of avoiding long handshaking procedures from the very first call.

Third Embodiment

Next a third embodiment will be described. This embodiment concerns a facsimile machine having a modem of the type described in ITU-T Recommendation V.34.

Figure 15:
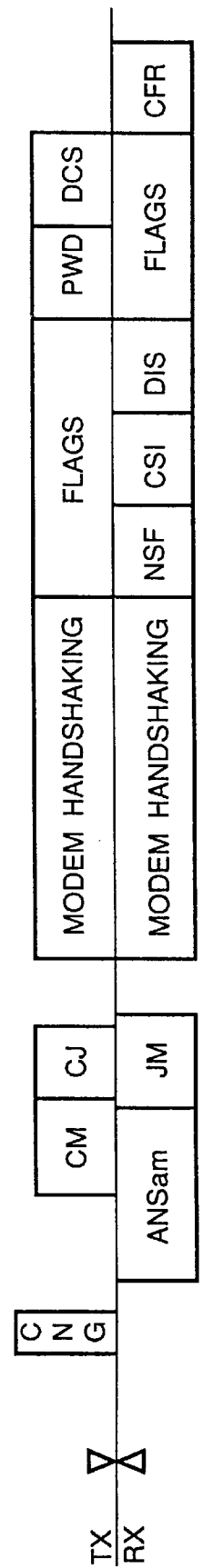
FIG. 15 illustrates a standard T.30 handshaking procedure employed by V.34-capable facsimile machines.

FIG. 15 illustrates the standard T.30 handshaking procedure used by facsimile machines with V.34 modems. In contrast to the procedures shown in FIGS. 3, 4, and 5, this handshaking procedure is a full-duplex procedure: both facsimile machines can transmit at once.

After receiving the calling tone (CNG), the called facsimile machine transmits a modulated answer tone (ANSam). Upon receiving this modulated answer tone, the calling facsimile machine sends a call menu (CM) terminated by a CM terminator (CJ), while the called facsimile machine replies with a Joint menu (JT). Transmission of these tones and menus takes several seconds. There then follows a V.34 modem handshaking procedure, lasting several more seconds, comprising line probing, training, and an exchange of modem parameters.

Next, the called facsimile machine transmits NSF, CSI, and DIS frames at the data transmission rate, e.g. 28,800 bps, established in the modem handshaking procedure, while the calling facsimile machine transmits flag data. If a certain bit in the DIS frame is set, the calling facsimile machine must then transmit a password (PWD), in addition to the digital command signal (DCS), while the called facsimile machine transmits flag information. If the called facsimile machine accepts the password and is ready to receive facsimile image data, it transmits a confirmation-to-receive (CFR) frame.

The T.30 handshaking procedure shown in FIG. 15 enables lengthy non-standard facilities (NSF) information to be sent at a high speed, but as noted earlier, this does not entirely solve the problem of unnecessary delays. If the calling facsimile machine submits an invalid password, for example, the called facsimile machine will terminate the call by disconnecting. In this case the preceding modulated answer tone, menu exchange, and modem handshaking turn out to have been unnecessary. The third embodiment addresses this type of problem.

Figure 16:
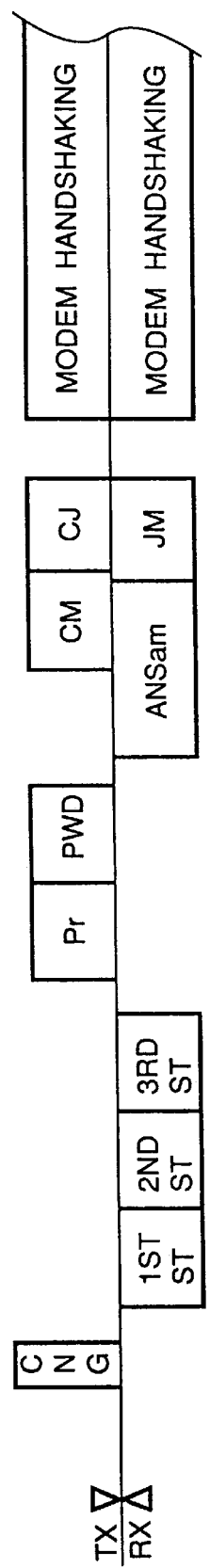
FIG. 16 illustrates a handshaking procedure according to a third embodiment of the invention.

FIG. 16 shows the handshaking procedure according to the third embodiment. Following reception of the calling tone (CNG), the called facsimile machine (RX) transmits a sequence of three non-standard tones. These tones have three different frequencies, the first of which also differs from the standard CED and ANSam frequencies. As an example, these frequencies may be 800Hz for the first tone (1st ST), 1600 Hz for second tone (2nd ST), and 2400 Hz for the third tone (3rd ST).

The frequencies of the first and third tones are fixed, but the frequency of the second tone may be selectable. The first tone announces the beginning of the tone sequence, the second tone indicates the meaning of the tone sequence, and the third tone announces the end of the tone sequence. In the description below, the 1600-Hz frequency of the second tone indicates a password request, and the third tone indicates that the called facsimile machine is ready to receive a password. This does not preclude the existence of other second-tone frequencies with different meanings, however.

After the third tone, the calling facsimile machine sends a HDLC preamble (Pr), followed by the password (PWD). The number of password bits is not large (e.g. 120 bits), so transmission of the preamble and password can be completed quickly, even at a slow data transmission rate. If the calling facsimile machine submits a valid password, the called facsimile machine then sends a modulated answer tone (ANSam) and proceeds with the standard T.30 handshaking procedure shown in FIG. 15, omitting the password request made in the DIS frame. If the calling facsimile machine submits an invalid password, the called facsimile machine immediately terminates the call by disconnecting.

Figure 17:
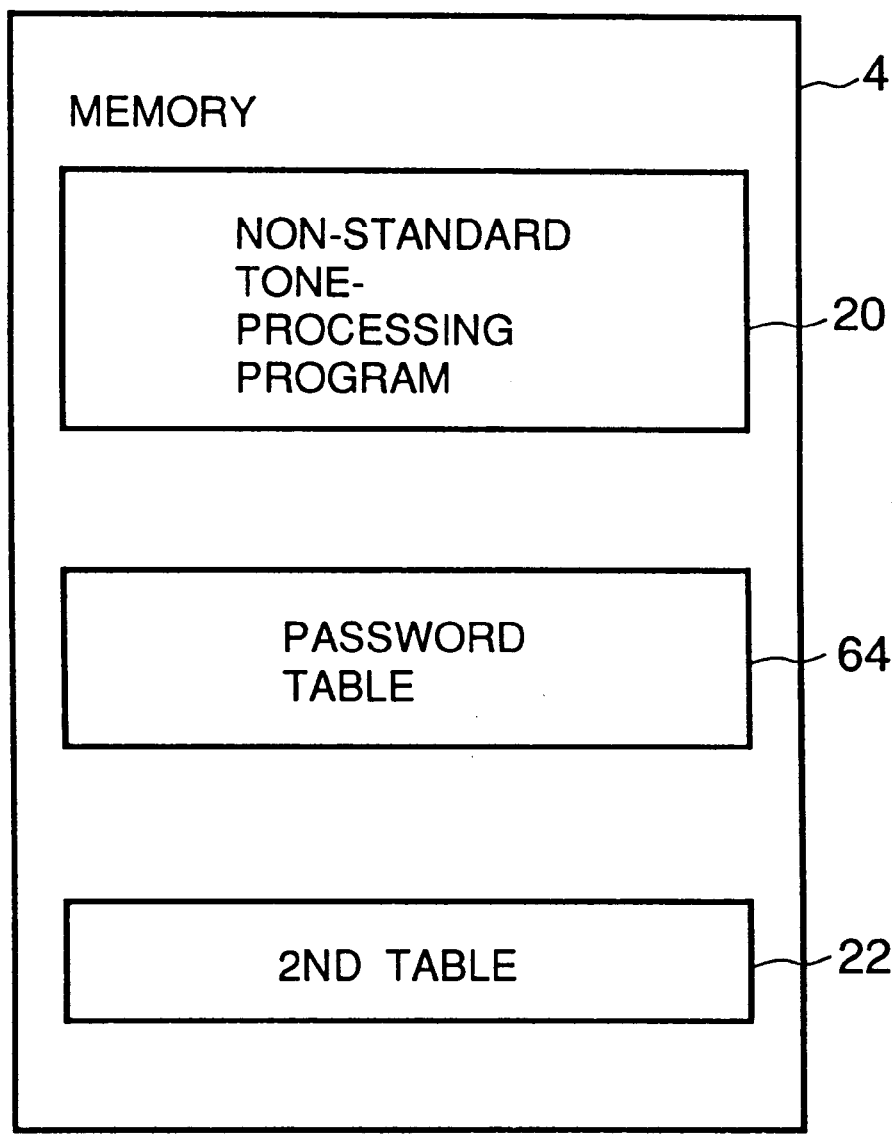
FIG. 17 illustrates the memory unit of a facsimile machine according to the third embodiment.

A facsimile machine implementing the third embodiment has the general configuration shown in FIG. 1, but differs in the contents of the memory unit 4. As shown in FIG. 17, the memory unit 4 now contains a password table 64, in addition to the non-standard tone-processing program 20 and second table 22. The password table 64 comprises a list of passwords that the facsimile machine regards as valid. These passwords are entered by the user of the facsimile machine, to restrict the distant facsimile machines from which facsimile transmissions may be received. The second table 22 describes the fixed frequencies of the first and third tones, the selectable frequencies of the second tone, and the meaning of each frequency. The non-standard tone transmitter 16 and non-standard tone detector 18 are of course adapted to transmit and detect tones of these frequencies.

The operation of a facsimile machine implementing the third embodiment will be described with reference to the flowcharts in FIGS. 18, 19, and 20.

Figure 18:
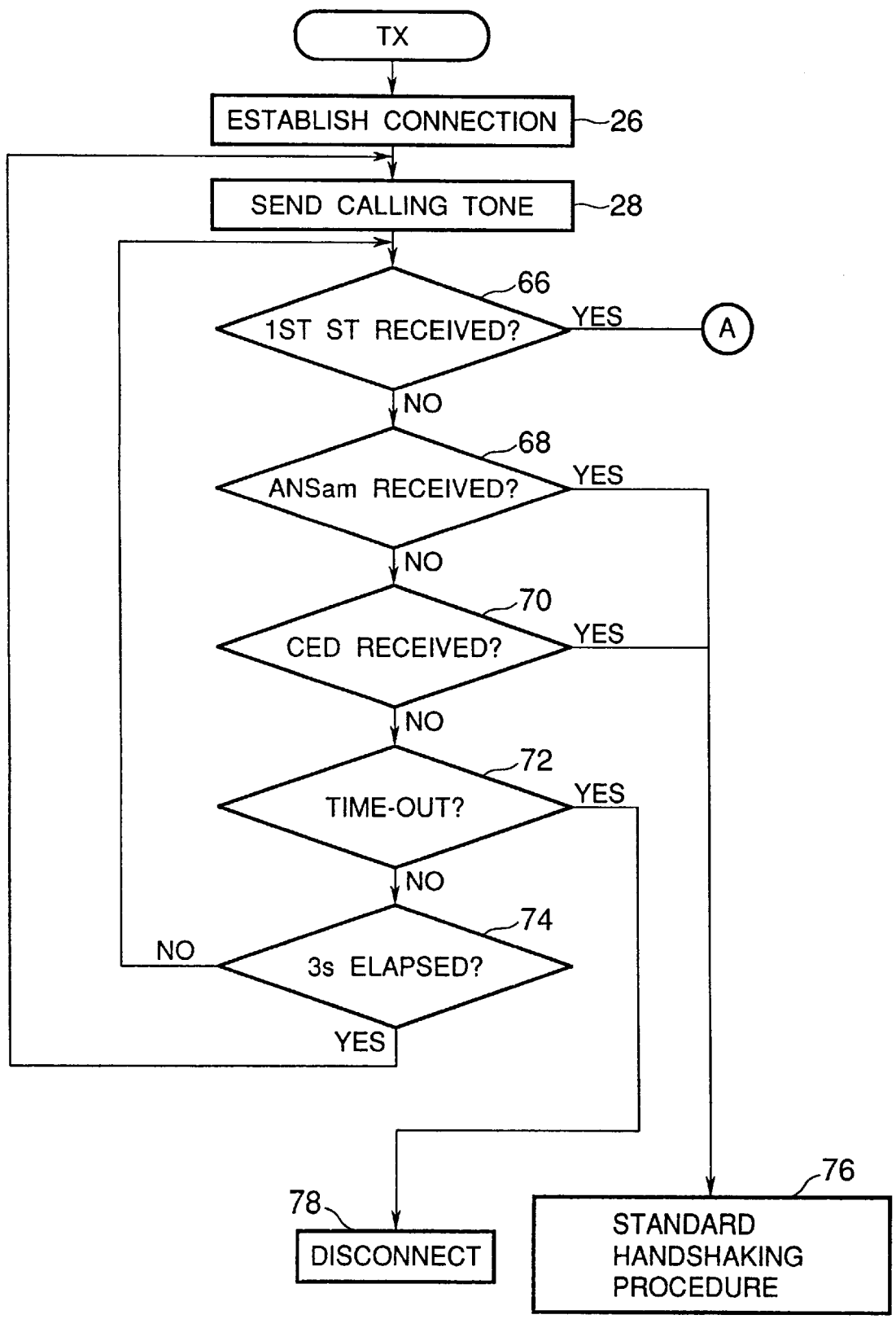
FIG. 18 illustrates part of a procedure followed by a calling facsimile machine according to the third embodiment.

FIG. 18 shows the first part of the handshaking procedure followed by the calling facsimile machine. In steps 26 and 28 a connection is established and a calling tone (CNG) is sent, as in the first and second embodiments. Sending of the calling tone (step 28) is mandatory in the third embodiment.

In steps 66, 68, and 70 the processing unit 2 determines whether the first non-standard tone (1st ST), a standard modulated answer tone (ANSam), or a standard called terminal identification tone (CED) is received. In step 72 the processing unit 2 determines whether a predetermined time has elapsed. In step 74 the processing unit 2 determines whether the three-second interval between calling tones has elapsed, and returns to step 66 if this interval has not elapsed.

If the first non-standard tone is received, the processing unit 2 branches from step 66 to a non-standard procedure that will be described in FIG. 19. If an ANSam or CED tone is received, the processing unit 2 branches from step 68 or 70 to the standard T.30 handshaking procedure illustrated in FIG. 3, FIG. 4, or FIG. 15 (step 76). As part of this procedure, the calling facsimile machine may transmit a password in response to a password-request bit set in the DIS frame by the called facsimile machine. If a time-out occurs in step 72, the processing unit 2 terminates the call by disconnecting (step 78). If the three-second interval in step 74 has elapsed, the processing unit 2 returns to step 28 and sends another calling tone.

Figure 19:
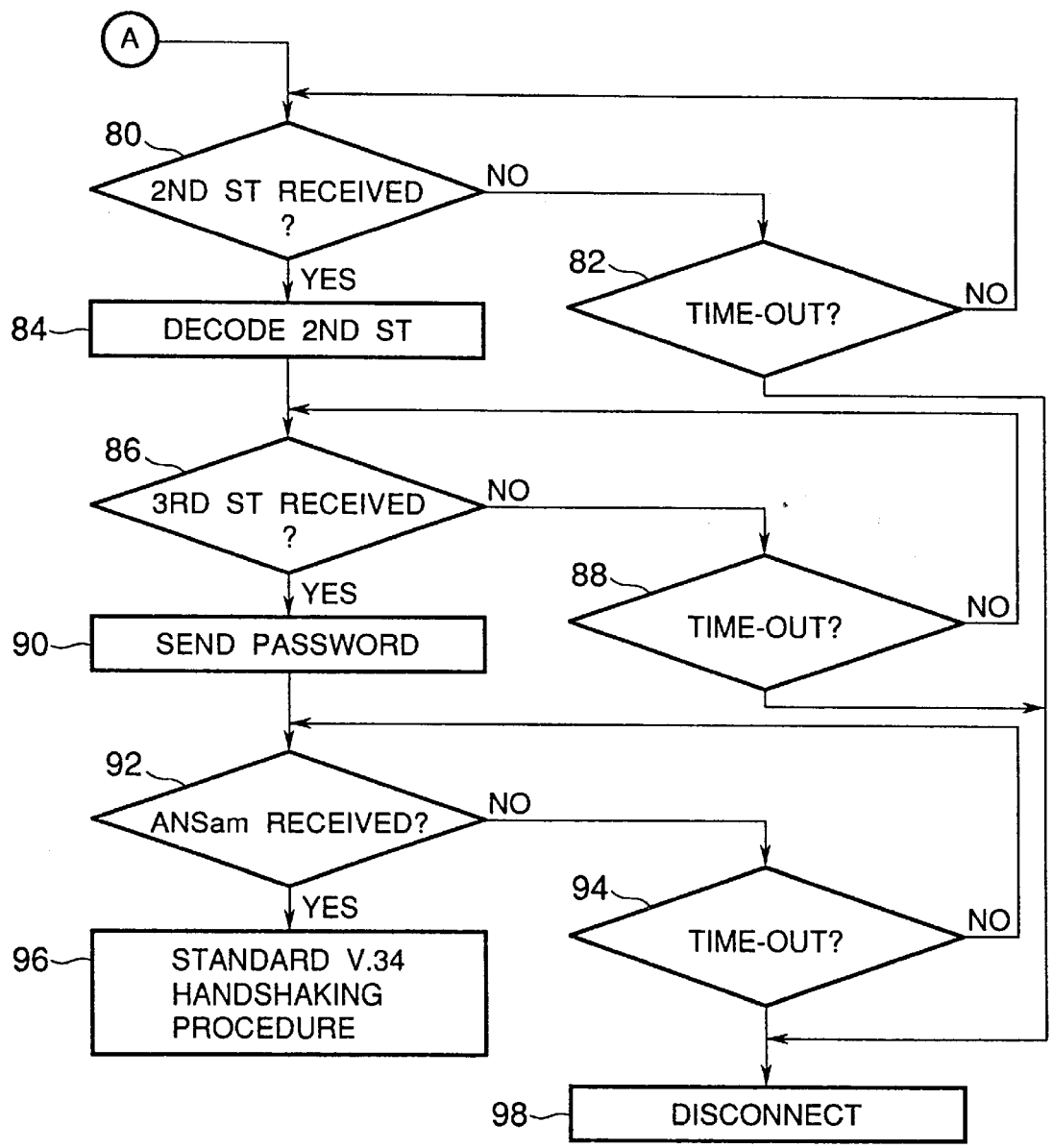
FIG. 19 illustrates another part of the procedure followed by the calling facsimile machine according to the third embodiment.

Referring to FIG. 19, if the first non-standard tone (1st ST) has been received, in steps 80 and 82 the processing unit 2 waits for the second non-standard tone (2nd ST). If received, this tone is decoded in step 84, with reference to the second table 22. Here it will be assumed that the second non-standard tone requests a password. The processing unit 2 waits to receive the third non-standard tone (3rd ST) in steps 86 and 88, sends a password in step 90, then waits to receive the modulated answer tone (ANSam) in steps 92 and 94.

If the ANSam tone is received, then in step 96 the processing unit 2 carries out the standard T.30 handshaking procedure for a V.34-capable facsimile machine, as shown in FIGS. 15 and 16. Since the called facsimile machine has already received the password, and does not need to make a second password request, the password-request bit in the DIS frame will not be set, and the calling facsimile machine will not transmit the password (PWD) at the position shown in FIG. 15. If the second or third non-standard tone or the ANSam tone is not received, causing a time-out in step 82, 88, or 94, the processing unit 2 terminates the call by disconnecting (step 98).

Figure 20:
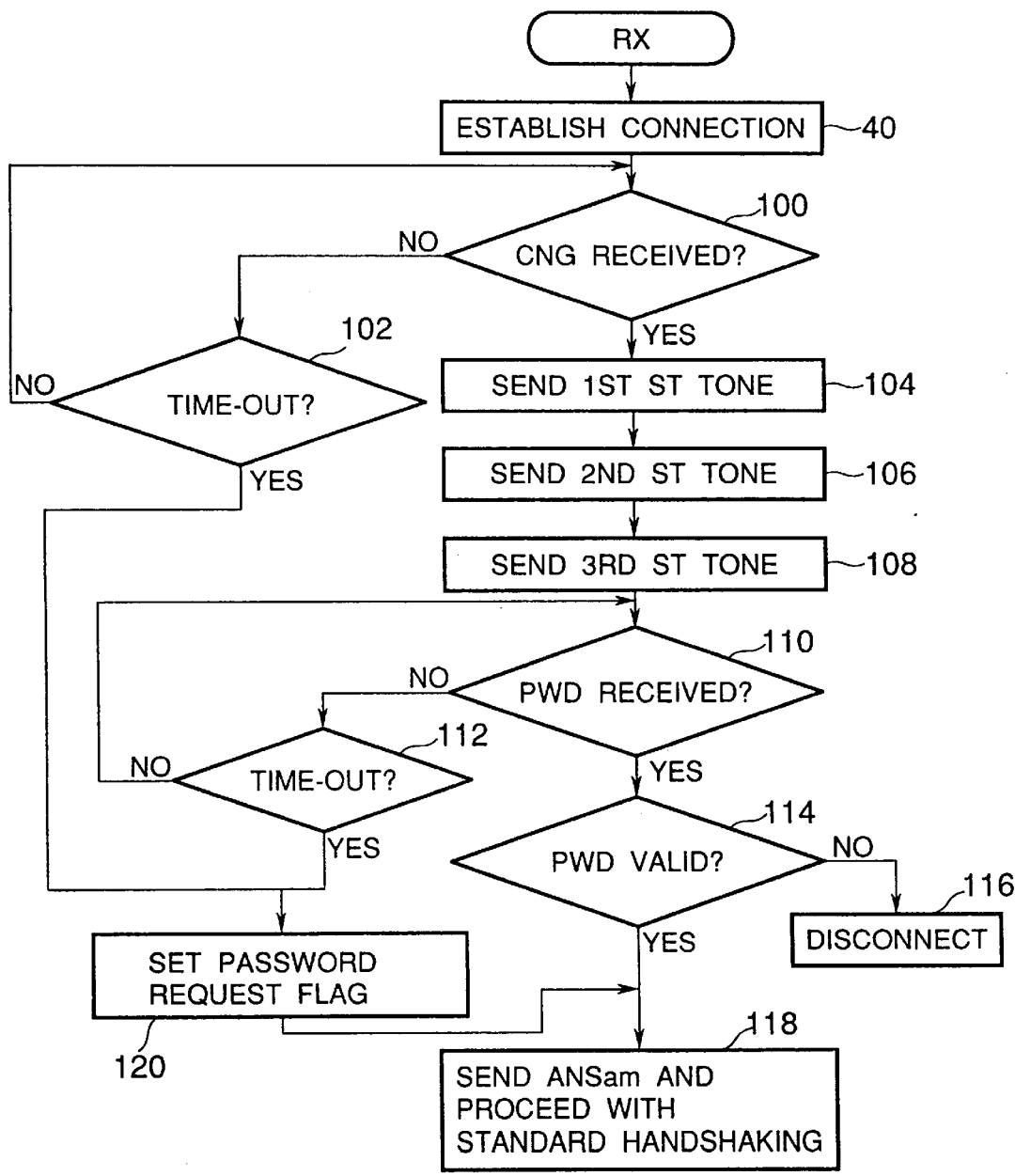
FIG. 20 illustrates part of a procedure followed by a called facsimile machine according to the third embodiment.

FIG. 20 shows the procedure followed by a called facsimile machine implementing the third embodiment.

After a telephone connection is established by the same step 40 as in the first or second embodiment, in steps 100 and 102 the processing unit 2 waits to receive a calling tone (CNG). Upon receiving the calling tone, the processing unit 2 commands the non-standard tone transmitter 16 to transmit the first non-standard tone (step 104), then the second non-standard tone (step 106), then the third non-standard tone (step 108).

After sending these three tones, in steps 110 and 112 the processing unit 2 waits to receive a password. If a password is received, in step 114 the processing unit 2 checks the password table 64 to determine if the password is valid. If the password is not valid, in step 116 the processing unit 2 terminates the call by disconnecting. If the password is valid, the processing unit 2 commands the modem 6 to transmit a modulated answer tone (ANSam) and proceeds with standard handshaking as shown in FIGS. 15 and 16, without making a further password request.

If no calling tone is received, or no password is received, causing a time-out in step 102 or step 112, the processing unit 2 sets an internal password request flag (step 120), then sends the modulated answer tone and proceeds with the standard T.30 handshaking procedure (step 118). The internal password request flag causes the processing unit 2 to set the password request bit in the DIS frame sent during this handshaking procedure, so that the calling facsimile machine must still submit a valid password before transmitting facsimile image data.

When both the calling and called facsimile machines implement the third embodiment, password formalities are completed at the beginning of the call, and if an invalid password is submitted, no time is wasted on unnecessary modem handshaking. If only the calling facsimile machine implements the third embodiment, the standard T.30 handshaking procedure is carried out. If only the called facsimile machine implements the third embodiment, standard T.30 handshaking is carried out, except that three non-standard tones are transmitted before the modulated answer tone (ANSam). Transmission of these three non-standard tones takes only a short time and does not greatly delay the handshaking procedure.

The reason for transmitting a sequence of three non-standard tones is to reduce the likelihood that unintended tones, such as tones from non-facsimile equipment, or frequency components of the human voice, will be mistaken for a password request. The single-frequency non-standard tones transmitted in the first and second embodiments can be replaced by similar three-tone sequences for improved reliability.

The invention is not limited to the embodiments described above. Although a password request was described in the third embodiment, non-standard tone sequences can also be used for other purposes by V.34-capable facsimile machines. For example, non-standard tones can be used to inform the calling facsimile machine of the types of paper loaded in the called facsimile machine, as in the first or second embodiment, so that if a necessary paper size is not available, the calling facsimile machine can terminate the call immediately, without unnecessary handshaking.

A non-standard tone sequence can also be used to eliminate part of the V.34 modem handshaking procedure, in substantially the same way that part of the handshaking procedure was eliminated in the first and second embodiments, by having each facsimile machine store and retain the modem parameters of the other facsimile machine, for use in subsequent calls.

Another possible use for the non-standard tones of the present invention is to indicate the amount of buffer space available for receiving facsimile image data in the called facsimile machine. This information enables the calling facsimile machine to terminate the call immediately if the called facsimile machine lacks sufficient buffer space to receive the facsimile image data.

The embodiments above have described the transmission of a single non-standard tone, a single non-standard tone followed by a non-standard multi-frequency tone, and a sequence of three single non-standard tones, but the invention is not limited to these particular patterns of tone transmission. For example, the called facsimile machine may begin by transmitting a sequence of more than three tones, or by transmitting a non-standard multi-frequency tone.

No attempt has been made to describe all possible T.30 handshaking procedures, which include various optional frames other than those mentioned above. These optional frames may of course be included when the present invention is practiced. For example, the calling facsimile machine may send a transmitting subscriber identification (TSI) frame.

Those skilled in the art will recognize that further modifications are possible within the scope claimed below.

What is claimed is:

1. A method of beginning a facsimile transmission from a calling facsimile machine to a called facsimile machine, when both the calling facsimile machine and the called facsimile machine follow a handshaking procedure for identifying and selecting capabilities to be used in the facsimile transmission, comprising the steps of:

storing a table of facsimile machine capabilities and corresponding non-standard tone frequencies in both said calling facsimile machine and said called facsimile machine;

selecting a frequency which describes a capability of said called facsimile machine from the table stored in said called facsimile machine;

sending a non-standard tone having the selected frequency from the called facsimile machine to the calling facsimile machine before sending any signals in said handshaking procedure from said called facsimile machine to said calling facsimile machine;

reading the table stored in said calling facsimile machine to determine the capability described by said non-standard tone;

determining whether information describing further capabilities of said called facsimile machine is already stored in said calling facsimile machine in a location identified by a telephone number of said called facsimile machine;

proceeding with said handshaking procedure, the calling machine using the capability described by the frequency of said non-standard tone and the information describing the further capabilities of said called facsimile machine already stored in said calling facsimile machine, without the called facsimile machine sending information describing said further capabilities, if said further information is already stored in said calling facsimile machine;

proceeding with said handshaking procedure, the called facsimile machine sending said information describing said further capabilities, if said further information is not already stored in said calling facsimile machine;

storing said information describing said further capabilities in said calling facsimile machine if said further information is not already stored in said calling facsimile machine; and retaining said information describing said further capabilities in said calling facsimile machine after said facsimile transmission, for use in later calls to said called facsimile machine.

2. The method of claim 1, wherein said frequency of said non-standard tone encodes information describing a capability of the called facsimile machine that is not set permanently in said called facsimile machine.

3. The method of claim 1, wherein said frequency of said non-standard tone encodes information describing a size of paper available at said called facsimile machine.

4. The method of claim 1, comprising the further steps of:

sending a multi-frequency tone from said called facsimile machine to said calling facsimile machine, encoding at least some of said information describing said further capabilities of said called facsimile machine, before proceeding with said handshaking procedure, if said information describing said further capabilities is not already stored in said calling facsimile machine;

determining from a response made by said calling facsimile machine to said multi-frequency tone, whether said calling facsimile machine has understood said multi-frequency tone; and proceeding with said handshaking procedure, without sending said information describing said further capabilities, if said calling facsimile machine has understood said multi-frequency tone.

5. The method of claim 1, comprising the further step of sending a calling tone from said calling facsimile machine to said called facsimile machine, said non-standard tone being sent in response to said calling tone.

6. The method of claim 1, wherein said called facsimile machine sends said non-standard tone if a predetermined time elapses without reception of a calling tone from said calling facsimile machine.

7. The method of claim 1, comprising the further step of updating the information describing the further capabilities of said called facsimile machine according to the capability described by the frequency of said non-standard tone, if the capability described by said frequency contradicts the information describing the further capabilities of said called machine.

8. A method of beginning a facsimile transmission from a calling facsimile machine to a called facsimile machine, when both the calling facsimile machine and the called facsimile machine follow a handshaking procedure for identifying and selecting capabilities to be used in the facsimile transmission, comprising the steps of:

sending at least one non-standard tone from the called facsimile machine to the calling facsimile machine, indicating a readiness to omit part of said handshaking procedure if a certain condition is satisfied, before sending any signals in said handshaking procedure from said called facsimile machine to said calling facsimile machine;

determining whether said condition is satisfied;

proceeding with said handshaking procedure, omitting said part, if said condition is satisfied; and proceeding with said handshaking procedure, not omitting said part, if said condition is not satisfied, wherein said step of sending at least one non-standard tone from the called facsimile machine to the calling facsimile machine comprises:

sending a first non-standard tone having a first frequency conditionally indicating readiness to omit part of said handshaking procedure;

sending a second non-standard tone having a second frequency, different from said first frequency, indicating the condition to be satisfied in order for said part of said handshaking procedure to be omitted; and sending a third non-standard tone having a third frequency, different from said first frequency and said second frequency, indicating readiness to receive a reply to said second non-standard tone.

9. The method of claim 8, wherein said part comprises all signals in said handshaking procedure other than a calling tone transmitted from said calling facsimile machine to said called facsimile machine, and said condition is that said calling facsimile machine sends an invalid password, comprising the further steps of:

sending a password from said calling facsimile machine to said called facsimile machine in response to said second non-standard tone, after reception of said third non-standard tone; and terminating said facsimile transmission by disconnecting said called facsimile machine, if said password is invalid.

10. A facsimile machine of a type that follows a handshaking procedure for identifying and selecting capabilities to be used in a facsimile transmission, comprising:

a tone transmitter for transmitting at least one non-standard tone when said facsimile machine answers a call, said non-standard tone having a selectable frequency, the selectable frequency encoding information describing a capability of said facsimile machine;

a tone detector for detecting said non-standard tone when transmitted from a called facsimile machine before said handshaking procedure begins;

a processing unit coupled to said tone transmitter and said tone detector, for controlling said handshaking procedure; and a memory storing a first table of telephone numbers of distant facsimile machines, from which said non-standard tone has been received with information describing capabilities of said distant facsimile machines, and a second table describing how the frequency of said non-standard tone encodes said information describing a capability of said facsimile machine wherein:

when said facsimile machine receives a call, said processing unit commands said tone transmitter to transmit said non-standard tone before said facsimile machine transmits any signals in said handshaking procedure, and said processing unit determines from a response received to said non-standard tone whether to transmit information describing capabilities of said facsimile machine during said handshaking procedure;

when said facsimile machine originates a call, if said tone detector does not detect said non-standard tone, said processing unit proceeds with said handshaking procedure;

when said facsimile machine originates a call to a distant facsimile machine having a telephone number stored in said first table, if said tone detector detects said non-standard tone, said processing unit reads the second table in said memory to determine the capability encoded by said non-standard tone, and reads the first table in said memory to obtain information describing further capabilities of said distant facsimile machine, and proceeds with said handshaking procedure, using the information read from said first table and the capability determined from said second table, without receiving said information describing said further capabilities from said distant facsimile machine; and when said facsimile machine originates a call to a distant facsimile machine not having a telephone number stored in said first table, if said tone detector detects said non-standard tone, said processing unit waits for said distant facsimile machine to send information describing said further capabilities, and stores said information together with the telephone number of said distant facsimile machine in said first table.

11. The facsimile machine of claim 10, wherein the frequency of said non-standard tone encodes information describing a capability that is not set permanently in said facsimile machine.

12. The facsimile machine of claim 10, wherein the frequency of said non-standard tone encodes a size of paper.

13. The facsimile machine of claim 10, wherein said tone transmitter is also capable of transmitting a multi-frequency tone with frequencies encoding said information describing further capabilities of said facsimile machine and said tone detector is capable of detecting said frequencies.

14. The facsimile machine of claim 13, wherein said memory unit also stores a third table indicating how the frequencies of said multi-frequency tone describe said capabilities.

15. The facsimile machine of claim 10 wherein, when said facsimile machine receives a call, if said facsimile machine receives a calling tone as specified in the handshaking procedure said processing unit responds by commanding said tone transmitter to transmit said non-standard tone.

16. The facsimile machine of claim 10 wherein, when said facsimile machine receives a call, if a predetermined time elapses without reception of a calling tone as specified in the handshaking procedure, said processing unit then commands said tone transmitter to transmit said non-standard tone.

17. A facsimile machine of a type that follows a handshaking procedure for identifying and selecting capabilities to be used in a facsimile transmission, comprising:

a tone transmitter for transmitting at least one non-standard tone when said facsimile machine answers a call, said non-standard tone having a frequency indicating a readiness to omit a part of said handshaking procedure if a certain condition is satisfied, said part comprising transmission and reception of information describing facsimile-machine capabilities;

a tone detector for detecting a tone having said frequency, transmitted from a called facsimile machine before said handshaking procedure begins; and a processing unit coupled to said tone transmitter and said tone detector, for controlling said handshaking procedure wherein:

when said facsimile machine receives a call, said processing unit commands said tone transmitter to transmit said non-standard tone before said facsimile machine transmits any signals in said handshaking procedure, said processing unit determines from a response received to said non-standard tone whether said condition is satisfied, and said processing unit omits said part of said handshaking procedure if said condition is satisfied; and when said facsimile machine originates a call, said processing unit proceeds with said handshaking procedure if said tone detector does not detect said non-standard tone, said processing unit determines whether said condition is satisfied if said tone detector detects said non-standard tone, and said processing unit omits said part of said handshaking procedure if said condition is satisfied; and further comprising a memory unit, coupled to said processing unit, for storing a first table of telephone numbers of distant facsimile machines from which said non-standard tone has been received, and information describing capabilities of said distant facsimile machines, wherein:

when said facsimile machine originates a call to a distant facsimile machine not having a telephone number stored in said first table, if said tone detector does not detect said non-standard tone, said processing unit waits for said distant facsimile machine to send information describing the capabilities of said distant facsimile machine, and stores said information together with the telephone number of said distant facsimile machine in said first table; and when said facsimile machine originates a call to a distant facsimile machine having a telephone number stored in said first table, if said tone detector detects said non-standard tone, said processing unit determines that said condition is satisfied and proceeds to send signals in said handshaking procedure without waiting for said distant facsimile machine to send said information again, said tone transmitter also being capable of transmitting a multi-frequency tone with frequencies encoding said information describing further capabilities of said facsimile machine and said tone detector being capable of detecting said frequencies wherein:

when said facsimile machine receives a call, if said response to said non-standard tone indicates that said condition is not satisfied, said processing unit commands said tone transmitter to transmit said multi-frequency tone, determines from a response received to said multi-frequency tone whether said multi-frequency tone has been understood, and omits said part of said handshaking procedure if said multi-frequency tone has been understood; and when said facsimile machine originates a call, if said tone detector receives both said non-standard tone and said multi-frequency tone, said processing unit decodes the frequencies of said multi-frequency tone, as detected by said tone detector, stores the corresponding information in said first table, and omits said part of said handshaking procedure.

18. A facsimile machine of a type that follows a handshaking procedure for identifying and selecting capabilities to be used in a facsimile transmission, comprising:

a tone transmitter for transmitting at least one non-standard tone when said facsimile machine answers a call, said non-standard tone having a frequency indicating a readiness to omit part of said handshaking procedure if a certain condition is satisfied;

a tone detector for detecting a tone having said frequency, transmitted from a called facsimile machine before said handshaking procedure begins; and a processing unit coupled to said tone transmitter and said tone detector, for controlling said handshaking procedure wherein:

when said facsimile machine receives a call, said processing unit commands said tone transmitter to transmit said non-standard tone before said facsimile machine transmits any signals in said handshaking procedure, said processing unit determines from a response received to said non-standard tone whether said condition is satisfied, and said processing unit omits said part of said handshaking procedure if said condition is satisfied; and when said facsimile machine originates a call, said processing unit proceeds with said handshaking procedure if said tone detector does not detect said non-standard tone, determines whether said condition is satisfied if said tone detector detects said non-standard tone, and omits said part of said handshaking procedure if said condition is satisfied;

said tone detector transmits, in sequence:

a first non-standard tone having a first frequency, conditionally indicating readiness to omit part of said handshaking procedure;

a second non-standard tone having a second frequency, different from said first frequency, indicating the condition to be satisfied in order for said part of said handshaking procedure to be omitted; and a third non-standard tone having a third frequency, different from said first frequency and said second frequency, indicating readiness to receive a reply to said second non-standard tone.

19. The facsimile machine of claim 18, wherein said second non-standard tone requests a password, said condition being that said facsimile machine receives an invalid password, and said part being all of said handshaking procedure other than transmission of a calling tone.

20. The facsimile machine of claim 19 wherein, when said facsimile machine receives a call, said processing unit terminates said call by disconnecting said facsimile machine if an invalid password is received in response to said third non-standard tone.

* * * * *